United States Patent [19]
Labana et al.

[11] 3,758,635
[45] Sept. 11, 1973

[54] POWDERED COATING COMPOSITIONS OF UNSATURATED GLYCIDYL COPOLYMERS WITH FLOW CONTROL AGENTS

[75] Inventors: Santokh S. Labana, Dearborn Heights; Yun Feng Chang, Plymouth; Ares N. Theodore, Farmington, all of Mich.

[73] Assignee: Ford Motor Company, Dearborn, Mich.

[22] Filed: Aug. 16, 1971

[21] Appl. No.: 172,222

[52] U.S. Cl. ..... 260/836, 117/93.4 R, 117/126 GE, 117/126 GR, 117/132 BE, 260/37 EP, 260/41 R, 260/41 A, 260/41 B, 260/41 C, 260/830 R, 260/DIG. 16
[51] Int. Cl............................................. C08g 45/04
[58] Field of Search ............ 260/836, 833 R, 830 R

[56] References Cited
UNITED STATES PATENTS

| | | | |
|---|---|---|---|
| 3,222,419 | 12/1965 | Jubilee | 260/836 |
| 3,070,564 | 12/1962 | Roeser | 260/836 |
| 3,423,481 | 1/1969 | Mizutani | 260/836 |
| 3,595,944 | 7/1971 | Manning | 260/836 |

Primary Examiner—Paul Lieberman
Attorney—Keith L. Zerschling and William E. Johnson

[57] ABSTRACT

Powder coating compositions are disclosed. In general, individual powder coating compositions of this invention are a mixture of the following materials. A copolymer of glycidyl methacrylate of glycidyl acrylate and an ethylenically unsaturated compound is formed in such proportions as to obtain a copolymer with a glass transition temperature in the range of 40°C to 90°C and a molecular weight ($M_n$) in the range of 2,500 to 8,500. The glycidyl compound is present in the copolymer from at least about 8 percent by weight to no more than about 25 percent by weight. Another material of the coating composition is a compound which contains tertiary nitrogen atoms in the amount of 0.5 to 10 parts by weight for 100 parts of the copolymer. A third material utilized in forming the powder coating mixture is a flow control agent which forms at least 0.05 percent by weight of the mixture. The flow control agent is a polymer having a molecular weight ($M_n$) of at least 1,000. The flow control agent also has a glass transition temperature at least 50°C below the glass transition temperature of the copolymer.

4 Claims, No Drawings

POWDERED COATING COMPOSITIONS OF UNSATURATED GLYCIDYL COPOLYMERS WITH FLOW CONTROL AGENTS

BACKGROUND OF THE INVENTION

Powder coating compositions for use in the painting of surfaces are extremely desirable. Such coating compositions are desirable because they eliminate the solvents utilized in liquid paint systems as, for example, the paint system shown in U.S. Pat. No. 2,857,354, issued Oct. 21, 1958. A powder coating paint composition is curable by heat in a manner that little, if any, volatile material is given off to the surrounding environment. This, of course, is substantially different from a liquid paint system as the liquid paint vehicle must be volatilized during the drying of the paint. Volatilization of the liquid vehicle carries such vaporized material into the surrounding ambient.

This invention is directed to powder coating compositions which are suitable for finishing surfaces of articles with a protective and decorative coating. The coatings produced by the compositions of this invention are comparable on all terms with the coating produced by the prior art liquid paint systems.

SUMMARY OF THE INVENTION

This invention is directed to powder coating compositions and, more particularly, to powder coating compositions which are curable by heat. A powder coating composition formed in accordance with the teachings of this invention comprises an intimate mixture of several materials. A first material of the mixture is a copolymer of glycidyl methacrylate or glycidyl acrylate and an ethylenically unsaturated compound in such proportions as to obtain a copolymer with a glass transition temperature in the range of 40°C to 90°C and with a molecular weight ($\bar{M}_n$) in the range of 2,500 to 8,500. The glycidyl compound is present in the copolymer from at least about 8 percent by weight to no more than about 25 percent by weight. Another material of the mixture is a compound containing tertiary nitrogen atoms in the amount of 0.5 to 10 parts by weight for 100 parts of the copolymer. Anothe material of the mixture is Another flow control agent which forms at least 0.05 percent by weight of the mixture. This flow control agent is a polymer having a molecular weight ($\bar{M}_n$) of at least 1,000. The flow control agent also has a glass transition temperature at least 50°C below the glass transition temperature of the copolymer.

The coating composition may also use therein a pigment which forms from about 6 percent by weight to about 35 percent by weight of the total mixture depending on the pigment selected. The powder coating compositions may also include a small weight percentage of an antistatic agent.

The preferred ranges for individual contents of the materials for the powder coating compositions described above is as follows. The glycidyl compound which forms a portion of the copolymer in the mixture should be present in the copolymer in the range of at least 8 percent by weight to no more than 25 percent by weight. A desirable range of the glycidyl compound in the copolymer is at least 12 percent by weight to no more than 18 percent by weight with the most desirable copolymer containing approximately 15 percent by weight of the glycidyl compound. Also, the preferred glass transition temperature for the copolymer is in the range of 50°C to 80°C with a molecular weight ($\bar{M}_n$) in the range of 3,000 to 6,500. The most desirable glass transition temperature for the copolymer is 60°C to 70°C with a molecular weight ($\bar{M}_n$) in the range of 3,000 to 4,000.

With respect to the compounds containing one or more tertiary nitrogen atoms, a variety of tertiary amines, tetra alkylammonium salts that decompose on heating to produce tertiary amines, pyrimidines, piperidines, pyridines, quinolines, isoquinolines, benzoguanamide and dicyandiamide may be used. Triethylonimine, trihylene diamine, tetramethylammonium hydroxide, benzoguanamine, 2-methyl-4-ethyl imidazole and dicyandiamide are the preferred nitrogeneous compounds.

With respect to the flow control agents used in the powder coating mixture, an individual agent selected for a mixture may be an acrylic polymer having a glass transition temperature at least 50°C below the glass transition temperature of the mixture's copolymer. Preferred acrylic polymers which may be used for the flow control agent are polylauryl acrylate, polybutyl acrylate, poly(2-ethylhexyl acrylate), polylauryl methacrylate and polyisodecyl methacrylate.

The flow control agent may also be a fluorinated polymer having a glass transition temperature at least 50°C below the glass transition temperature of the copolymer. Preferred flow control agents, if the agent is a fluorinated polymer, are esters of polyethyleneglycol or polypropylene glycol and fluorinated fatty acids. For example, an ester of polyethyleneglycol of molecular weight of over 2,500 and perfluoro octanoic acid is useful as a flow control polymer.

In addition to the glycidyl methacrylate or glycidyl acrylate monomer used in all copolymer forming mixtures, other monomers which may be used are methyl methacrylate, butyl methacrylate, butyl acrylate, ethyl acrylate, 2-ethylhexyl acrylate, styrene, alpha methyl styrene, acrylonitrile and methacrylonitrile. The glycidyl compound and the ethylenically unsaturated monomers are mixed and reacted in such proportions as to obtain the copolymer for the powder coating mixture which has a glass transition temperature and a molecular weight as set forth above.

The powder coating compositions of this invention may also contain from about 6 percent by weight to about 35 percent by weight of a pigment. The various pigments already known in the art may be employed in the powder coating compositions. The pigments are generally selected for color, appearance or corrosion protection properties.

A small weight percent of an antistatic agent may also be employed in the powder coating composition. For example, 0.05 percent by weight to 0.5 percent by weight of the powder coating composition may be an antistatic agent so that the coating may be applied in an electrostatic spraying operation.

DESCRIPTION OF THE PREFERRED EMBODIMENT

A general discussion of the various materials which may be employed in the powder coating compositions of this invention will be set forth below. Also, a plurality of examples will be employed to show the manner in which various, individual, powder coating compositions, which fall within the scope of this invention, are prepared and utilized.

The principle material in individual powder coating compositions is a copolymer formed from glycidyl methacrylate or glycidyl acrylate and an ethylenically unsaturated monomer in such proportions as to obtain a copolymer with a glass transition temperature in the range of 40°C to 90°C and a molecular weight ($\bar{M}_n$) in the range of 2,500 to 8,500. The ethylenically unsaturated monomer employed to form the copolymer is any one, or a mixture of, the many different monomers known to those skilled in the art. In forming the copolymer, the glycidyl compound is present in the final copolymer from at least about 8 percent by weight to no more than about 25 percent by weight. The balance of the weight of the copolymer is formed from the ethylenically unsaturated monomers.

The preferred ethylenically unsaturated monomers which are employed to form the copolymer with the glycidyl compound are methyl methacrylate, butyl methacrylate, butyl methacrylate, butyl acrylate, ethyl acrylate, 2-ethylhexyl acrylate. Suitable modifying monomers such as styrene, alpha methyl styrene, acrylonitrile and methacrylonitrile can be used with the preferred monomers. When used, a modifying monomer is present in the copolymer from a weight percent of about 0 percent by weight to no more than about 35 percent by weight. Thus, when the preferred ethylenically unsaturated monomers are used with glycidyl compound to form the copolymer, the glycidyl compound is present in the copolymer from 8 percent by weight to about 25 percent by weight, the modifying monomer is present from about 0 percent by weight to no more than about 35 percent by weight, and the preferred monomer is present from about 92 percent by weight to about 40 percent by weight.

In accordance with the detailed teachings of this invention, the copolymer for the powder coating composition is formed from glycidyl methacrylate or glycidyl acrylate, methyl methacrylate, and butyl methacrylate. In this instance, the glycidyl compound is present in the copolymer from about 8 percent by weight to no more than about 25 percent by weight, the methyl methacrylate is present in the copolymer from about 25 percent by weight to about 60 percent by weight, and the balance of the copolymer is butyl methacrylate.

The copolymers of the glycidyl compound can be prepared by a variety of methods. Generally, a free radical initiator is needed to induce polymerization reaction. A large number of free radical initiators are known in the art. These include benzoyl peroxide, lauryl peroxide, t-butyl- hydroxy peroxide, acetylcyclohexane sulfonyl peroxide, diisobutyryl peroxide, di-(2-ethylhexyl) peroxydicarbonate, diisopropyl peroxydicarbonate, t-butylperoxypivalate decanoyl peroxide, azobis (2-methylpropionitrile) (AIBN), etc. The polymerization is preferably carried out in solution using a solvent in which the glycidyl compound copolymer is soluble. Toluene, xylene, dioxane, butanone, etc., are suitable solvents for polymerization. If the glycidyl compound copolymer is prepared in solution, the solid copolymer can be obtained by evaporating the solvent under vacuum or spray drying techniques. Alternatively, the copolymer can be precipitated by pouring the solution at a slow rate into a non-solvent liquid such as hexane, octane or water under a suitable agitation condition. The copolymer thus obtained should be further dried so that it contains less than three percent of the volatile liquids.

Glycidyl compound copolymers can also be prepared by emulsion polymerization, suspension polymerization, bulk polymerization or their suitable combinations. In these methods of preparing glycidyl compound copolymers, chain transfer agents may be required to control the molecular weight of the copolymer to a desired range.

For powder coating applications, molecular weight and molecular weight distribution of the glycidyl compound copolymer is important. Copolymer of average molecular weight ($\bar{M}_n$) in the range of 2,500 to 8,500 are suitable. These copolymers, however, must not contain significant amount of higher molecular weight fractions. No more than 2 percent of the copolymer can be of molecular weight greater than 20,000. The molecular weight distribution as measured by the ratio of weight average molecular weight to number average molecular weight ($\bar{M}_w/\bar{M}_n$) should be in the range of 1.6 to 2.1. The preferred range of molecular weight distribution is in the range of 1.7 to 1.8.

Another one of the materials of individual ones of the powder coating compositions of this invention is the cross linking agent for the copolymer. In this case, the cross linking agent is a compound containing one or more tertiary nitrogen atoms. To supply the tertiary nitrogen atoms, a variety of tertiary amines, tetra alkylammonium salts that decompose on heating to produce tertiary amines, pyrimidines, piperidines, pyridines, quinolines, isoquinolines, benzoguanamine and dicyandiamide may be used. The compound containing the tertiary nitrogen atoms should be present in the amount of 0.5 to 10 parts by weight for each 100 parts of the copolymer. Triethylonamine, triethylene diamine, tetramethylammonium hydroxide, benzoguanamine, 2-methyl-4-ethyl imidazole and dicyandiamide are the preferred nitrogeneous compounds.

A flow control agent is also included in forming each individual ones of the powder coating compositions of this invention. The flow control agent forms at least 0.05 percent by weight of an individual powder coating. The flow control agent generally does not exceed about 4 percent by weight of any individual powder coating composition. In general, the flow control agent is a polymer having a molecular weight ($\bar{M}_n$) of at least 1,000. Further, the flow control agent has a glass transition temperature at least 50°C below the glass transition temperature of the copolymer employed in forming the composition.

One type of material which is used as a flow control agent in the powder coating compositions is an acrylic polymer having a glass transition temperature below the glass transition temperature of the composition's copolymer. Some acrylic polymers which are preferred as flow control agents are polylauryl acrylate, polylauryl methacrylate, polybutyl acrylate, polybutyl methacrylate, poly(2-ethylhexyl acrylate) and poly(2-ethylhexyl methacrylate). Acrylic polymers to be used as flow control agents can be prepared by polymerization of the acrylate or methacrylate monomers in bulk or in suitable solvent using well known free radical initiators. The amount of the initiator and the polymerization conditions are chosen so that polymer formed has molecular weight ($\bar{M}_n$) above 1,000. The preferred molecular weight range of the acrylate polymer is above 5,000. The most preferred range of the acrylate polymer is 6,000 to 20,000.

Although polymeric acrylate flow control agents are preferred, fluorinated polymers have been found to act as flow control agents for the powder coating compositions. Such fluorinated polymers are esters of polyethyleneglycol or polypropyleneglycol and fluorinated fatty acids. Esters of polyethyleneglycol of molecular weight ($\overline{M}_n$) of over 2,500 and perfluoro octanoic acid are useful as flow control agents for the compositions of this invention.

Since individual powder coating compositions of this invention can be applied to an article to be painted by electrostatic methods, it is preferred to include a small weight percentage of an antistatic agent is such compositions so that the deposition thereof is accomplished in a proper manner. In particular, the antistatic agent is included in a range from 0.05 percent to 1.0 percent by weight of the total powder composition. Suitable antistatic agents include, but are not limited to, tetralkylammonium salts, alkyl-poly (ethyleneoxy) phosphates as, for example, dibutyl-poly (ethyleneoxy) phosphate or alkylaryl poly (ethyleneoxy) phosphates as, for example, ethyl benzyl poly (ethyleneoxy) phosphate.

In order to give individual powder coating compositions of this invention a suitable color, a pigment is included in the coating composition. In general, the pigment forms from about 6 percent by weight to about 35 percent by weight of the total powder coating composition. Pigments which are suitable for powder coating compositions include, but are not limited to, the following: basic lead silico chromate 30 percent by weight (orange); titanium dioxide 30 percent by weight (white); titanium dioxide 15 percent by weight plus ultra marine blue 10 percent by weight (blue); phthalocyanine blue 7 percent by weight plus titanium dioxide 10 percent by weight (blue); phthalocyanine green 7 percent by weight plus titanium dioxide 10 percent by weight (green); ferrite yellow 7 percent by weight plus titanium dioxide 10 percent by weight (yellow); carbon black pigment 6 percent by weight (black); black iron oxide 10 percent by weight (black); chromium green oxide 8 percent by weight plus titanium dioxide 10 percent by weight (green); quindo red 5 percent by weight plus titanium dioxide 16 percent by weight (red); and iron oxide transparent orange pigment 10 percent by weight (orange).

Having generally described the various materials which are employed in formulating the powder coating compositions of this invention, a plurality of examples will be set forth to illustrate various individual powder coating compositions.

EXAMPLE 1

The monomers, glycidyl methacrylate 15 percent by weight, methyl methacrylate 45 percent by weight and butyl methacrylate 40 percent by weight are mixed together. Three weight percent of a catalyst 2,2'-azobis-(2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°C–112°C) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110°C. Drying is continued unti the solvent content of the copolymer is below 3 percent. The trays are cooled and the copolymer collected and ground to pass through 20 mesh screen. The copolymer has a glass transition temperature of 53°C and a molecular weight ($\overline{M}_n$) of 4,000.

One hundred parts by weight of the ground copolymer are mixed with the following materials:

| | |
|---|---|
| 2-methyl-4-ethylimidazole | 0.5 parts |
| Tetrabutylammonium bromide | 0.2 parts |
| Polylauryl acrylate ($\overline{M}_n$=10,000) | 0.5 parts |
| Titanium dioxide | 30 parts |

The materials are mixed together in a ball mill for 2 hours. The mixture is milled rolled at 85°C to 90°C for 5 minutes. The solid obtained is ground in a ball mill to pass through a 140 mesh screen.

The resulting powder thus obtained is a powder coating composition of the invention. The powder is sprayed on an electrically grounded, steel panel by using an electrostatic powder spray gun operating at 50 KV charting voltage. After spraying, the panel is heated at 175°C for 20 minutes.

The coating obtained on the panel has good adhesion to the steel panel. The coating also is applied to and has good adhesion on panels of glass, brass, zinc, aluminum, copper and bronze. The coating obtained is not soluble in gasoline or methanol.

EXAMPLE 2

The procedure of Example 1 is repeated. The formation of the copolymer, however, begins with a monomer mixture having glycidyl methacrylate 8 percent by weight, methyl methacrylate 52 percent by weight and butyl methacrylate 40 percent by weight. Three weight percent of the catalyst AIBN is employed. When the procedure of Example 1 is followed, the resulting copolymer has a glass transition temperature of 58°C and a molecular weight of 4,000.

One hundred parts of the copolymer produced is mixed with the same additional ingredients set forth in Example 1, except using 0.2 parts of triethylenediamine as the cross linking agent. The quality of the painted panels obtained after application of the powder coating to various materials is about the same as achieved in Example 1.

EXAMPLE 3

A monomer mixture having the following composition is prepared: glycidyl methacrylate 12 percent by weight, methyl methacrylate 48 percent by weight, and butyl methacrylate 40 percent by weight. The monomer mixture is processed in the same manner as described in Example 1 with 3 percent by weight of the catalyst AIBN employed. The resulting copolymer has a glass transition temperature of 56°C and a molecular weight of 4,000. 100 parts of the copolymer produced is mixed with the same additional ingredients described in Example 1, except 0.8 parts 2-ethyl-4-methylimidazole are used as the crosslinking agent.

The powder coating composition obtained by following the process steps set forth in Example 1 is applied to test panels in the same manner as described in Example 1. The coating is baked at a temperature of 170°C for 30 minutes. The coating obtained has good adhesion to steel, glass, brass, zinc, aluminum, copper and bronze.

EXAMPLE 4

A monomer mixture having the following composition is prepared: glycidyl methacrylate 20 percent by weight, methyl methacrylate 40 percent by weight and butyl methacrylate 40 percent by weight. A copolymer is formed from this monomer mixture in accordance with the same procedure as is outlined in Example 1. In this case, 1 percent by weight of the catalyst AIBN is added. The copolymer produced has a glass transition temperature of 51°C and a molecular weight of 8,500.

The ground copolymer (100 parts by weight) is added to the following materials:

| | |
|---|---|
| Dicyandiamide | 2 parts |
| Tetrabutylammonium chloride | 0.1 parts |
| Polybutylacrylate ($\overline{M}_n = 9,000$) | 4 parts |
| Titanium dioxide | 15 parts |
| Ultra marine blue | 10 parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 200°C for 10 minutes is of good quality, and is resistant to the solvents set forth in Example 1.

EXAMPLE 5

A monomer mixture having the following composition is prepared: glycidyl methacrylate 25 percent by weight, methyl methacrylate 40 percent by weight and butyl methacrylate 35 percent by weight. The monomers are reacted as described in Example 1 to produce a copolymer. In this case, 6 percent by weight of the catalyst AIBN is employed. The resulting copolymer has a glass transition temperature of 53°C and a molecular weight of 2,000.

One hundred parts by weight of the copolymer obtained is mixed with the following materials:

| | |
|---|---|
| Tributylamine | 0.5 parts |
| Dibutyl poly(ethyleneoxy) phosphate | 0.05 parts |
| Polyisododecylmethacrylate | 4 parts |
| Titanium dioxide | 10 parts |
| Phthalocyanine blue | 7 parts |

A powder coating composition is obtained by following the process steps set forth in Example 1. The coating composition is applied to a series of test panels and baked at the temperature of and for the same time as Example 4. The coating obtained on the various test panels is of poor quality with respect to its adhesion appearance and impact characteristics.

EXAMPLE 6

A monomer mixture having the following composition is prepared: glycidyl methacrylate 15 percent by weight, butyl acrylate 20 percent by weight and methyl methacrylate 65 percent by weight. The monomer is reacted as set forth in Example 1 in order to produce a copolymer. Four percent by weight of the catalyst AIBN is employed in reacting the monomer mixture to form the copolymer. The copolymer has a glass transition temperature of 65°C and a molecular weight of 3,000.

One hundred parts by weight of the copolymer obtained is added to the following materials:

| | |
|---|---|
| Benzoguanimine | 5 parts |
| Polylaurylmethacrylate ($\overline{M}_n = 6000$) | 2 parts |
| Phthaloycanine green | 7 parts |
| Titanium dioxide | 10 parts |

The above described materials are processed as described in Example 1 in order to produce a powder coating composition. The power coating composition is applied to test panels as described in Example 1 and baked on the panels at a temperature of 150°C for 15 minutes.

The coating obtained has good adhesion to steel, glass, brass, zinc, aluminum, copper and bronze and is insoluble in gasoline and methanol.

EXAMPLE 7

A monomer mixture having the following composition is prepared: glycidyl methacrylate 15 percent by weight, methyl methacrylate 50 percent by weight and styrene 35 percent by weight. The monomers are reacted in accordance with the procedure set forth in Example 1 with 3 percent by weight of the catalyst AIBN being utilized. The resulting ground copolymer has a molecular weight of 4,500 and a glass transition temperature of 90°C.

One hundred parts by weight of the copolymer obtained is added to the following materials:

| | |
|---|---|
| Triethanolamine | 1 part |
| Poly(2-ethylhexyl acrylate) | 2 parts |
| Ferrite yellow | 7 parts |
| Titanium dioxide | 10 parts |

This mixture is processed as described in Example 1 in order to form a powder coating composition. The powder coating composition is applied to test panels as described in Example 1. The panels are baked at a temperature of 180°C for 5 minutes. The adhesion quality of the powder coating after baking on the various test panels is good. The coating on each panel possesses good solvent and scratch resistance.

EXAMPLE 8

A monomer mixture having the following composition is formed: glycidyl methacrylate 18 percent by weight, ethyl acrylate 20 percent by weight, methyl methacrylate 40 percent by weight, vinyl chloride 22 percent by weight. The monomer mixture is polymerized by using 2 weight percent of the catalyst AIBN as the initiator.

One hundred parts of the ground copolymer obtained is added to the following materials:

| | |
|---|---|
| N,N-dimethylaniline | 2 parts |
| Trimethyl benzyl ammonium chloride | 0.1 part |
| Poly(2-ethylhexyl acrylate) ($\overline{M}_n = 11,000$) | 2 parts |
| Carbon black | 6 parts |

The above materials are mixed and processed as set forth in Example 1. The resulting powder coating composition is applied to test panels as specified in Example 1. The coating composition is baked at 170°C for 15 minutes. All the painted panels exhibit good adhesion and solvent resistance properties.

EXAMPLE 9

A monomer mixture having the following composition is formed: glycidyl methacrylate 15 percent by weight, methyl methacrylate 30 percent by weight, isobutyl acrylate 25 percent by weight, alpha methyl styrene 15 percent by weight and methacrylonitrile 15 percent by weight. The monomer mixture is reacted in the same manner as described in Example 1. Three percent of the catalyst AIBN is employed. The resulting copolymer has a glass transition temperature of 46°C and a molecular weight of 4,500.

One hundred parts of the ground copolymer obtained is added to the following materials:

| | |
|---|---|
| Quinoline | 1.5 parts |
| Polyethylene glycol perfluoro octonoate | 2 parts |
| Black iron oxide | 10 parts |

The mixture so formed is processed as described in Example 1 to produce a powder coating composition. This powder coating composition is applied to test panels as it is described in Example 1. The coated panels are baked at 165°C for 15 minutes. The coating on each panel has good adhesion and solvent resistance.

EXAMPLE 10

A monomer mixture having the following composition is prepared: glycidyl methacrylate 5 percent by weight, methyl methacrylate 55 percent by weight, and butyl methacrylate 40 percent by weight. The monomer mixture is reacted as described in Example 1 with 6 percent by weight of the catalyst AIBN. The resulting copolymer has a glass transition temperature of 55°C and a molecular weight of 3,000.

One hundred parts by weight of the ground copolymer is mixed with the following materials:

| | |
|---|---|
| Isoquinoline | 2 parts |
| Ethylbenzyl (ethyleneoxy) phosphate | 0.5 parts |
| Poly(2-ethylhexyl acrylate) | 0.4 parts |
| Chromium green oxide | 8 parts |
| Titanium dioxide | 10 parts |

The above mixture is processed as described in Example 1 to produce a powder coating composition. The powder coating composition is applied to a plurality of test panels. The panels are baked at a temperature of 170°C for 20 minutes. The adhesion to the test panels of the powder coating material is poor and coating has a tendency to chip and crack.

EXAMPLE 11

A monomer mixture is formed having the following composition: glycidyl methacrylate 12 percent by weight, methyl methacrylate 50 percent by weight, 2-ethylhexyl acrylate 10 percent by weight and acrylonitrile 28 percent by weight. The monomer mixture is processed as set forth in Example 1 in order to form a copolymer. Four percent by weight of the catalyst AIBN is added. The copolymer formed has a glass transition temperature of 60°C and a molecular weight of 4,000.

one hundred parts by weight of the ground copolymer is mixed with the following materials:

| | |
|---|---|
| N-methylmorpholine | 1 parts |
| Polyethylene glycol perfluoro octonoate | 2 parts |
| Quindo red | 5 parts |
| Titanium dioxide | 15 parts |

The mixture above described is processed as set forth in Example 1 to produce a powder coating composition. The powder coating composition is applied to test panels as described in Example 1. The panels are baked at 150°C for 20 minutes. The adhesion to the panels of the powder coating is good and the coating possesses good solvent resistance.

EXAMPLE 12

A monomer mixture having the following composition is prepared: glycidyl methacrylate 22 percent by weight, n-hexyl methacrylate 20 percent by weight, butyl methacrylate 25 percent by weight and acrylonitrile 33 percent by weight. A copolymer is formed from this monomer mixture in accordance with the same procedure as is outlined in Example 1. In this case, 1.5 percent by weight of the catalyst AIBN is added. The copolymer produced has a glass transition temperature of 40°C and a molecular weight of 7,500.

The ground copolymer (100 parts by weight) is added to the following materials:

| | |
|---|---|
| N,N-diethylaniline | 3 parts |
| Polybutyl acrylate | 2.0 parts |
| Iron oxide transparent orange | 10 parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 140°C for 20 minutes is of good quality, and is of good quality, and is solvent and scratch resistant.

EXAMPLE 13

A monomer mixture having the following composition is prepared: glycidyl methacrylate 10 percent by weight, methyl methacrylate 45 percent by weight, butyl methacrylate 35 percent by weight and vinyl acetate 10 percent by weight. A copolymer is formed from this monomer mixture in accordance with the same procedure as is outlined in Example 1. In this case, 3 percent by weight of the catalyst AIBN is added.

The ground copolymer (100 parts by weight) is added to the following materials:

| | |
|---|---|
| N,N-diethylcyclohexylamine | 1 part |
| Poly(2-ethylhexyl acrylate) | 3.5 parts |
| Carbon black | 6 parts |

The above ingredients are mixed together and processed in accordance with the procedure of Example 1 to obtain a powder coating composition. The powder coating composition is sprayed on various test panels. The coating obtained on each test panel after curing of the powder coating composition at a temperature of 160°C for 10 minutes is of good quality. Also, the coating obtained on each test panel is insoluble in gasoline and methanol.

EXAMPLE 14

A monomer mixture having the following composition is prepared: glycidyl methacrylate 8 percent by weight, methyl methacrylate 52 percent by weight and isobutyl methacrylate 40 percent by weight. A copolymer is formed from this monomer mixture in accordance with the same procedure as is outlined in Example 1. In this case, 5 percent by weight of the catalyst AIBN is added. The copolymer produced has a glass transition temperature of 75°C and a molecular weight of 3,200.

The ground copolymer (100 parts by weight) is added to the following materials:

| | |
|---|---|
| Benzoguanamine | 5 parts |
| Tetrabutylammonium bromide | 2 parts |
| Polylauryl acrylate | 4 parts |
| Titanium dioxide | 30 parts |

The above ingredients are mixed together and processed in accordance with the procedure of Example 1 to obtain a powder coating composition. The powder coating composition is sprayed on various test panels of steel, brass, glass, zinc, aluminum, copper and bronze. The coating obtained on each test panel after curing of the powder coating composition at a temperature of 130°C for 10 minutes is of good quality and is solvent and scratch resistant.

EXAMPLE 15

A monomer mixture having the following composition is prepared: glycidyl methacrylate 10 percent by weight, methyl methacrylate 67 percent by weight, and n-butyl methacrylate 23 percent by weight. A copolymer is formed from this monomer mixture in accordance with the procedure as is outlined in Example 1. In this case, 4 percent by weight of the catalyst AIBN is added. The copolymer produced has a glass transition temperature of 73°C and a molecular weight of 3,000.

The ground copolymer (100 parts by weight) is added to the following materials: ps

| | |
|---|---|
| Dicyandiamide | 3 parts |
| Tetrabutylammonium chloride | 0.7 parts |
| Polybutyl acrylate | 2 parts |
| Titanium dioxide | 30 parts |

The above ingredients are mixed together and processed in accordance with the procedure of Example 1 to obtain a powder coating composition. The powder coating composition is sprayed on various test panels. The coating obtained on each test panel after curing of the powder coating composition at a temperature of 180°C for 15 minutes is of good quality. Also, each of the test panel coating's is resistant to and insoluble in gasoline and methanol.

EXAMPLE 16

A monomer mixture having the following composition is prepared: glycidyl methacrylate 15 percent by weight, methyl methacrylate 32 percent by weight, ethyl acrylate 15 percent by weight, isobutyl acrylate 8 percent by weight and styrene 30 percent by weight. A copolymer is formed from this monomer mixture in accordance with the same procedure as is outlined in Example 1. In this case, 3 percent by weight of the catalyst AIBN is added.

The ground copolymer (100 parts by weight) is added to the following materials:

| | |
|---|---|
| Benzoguanamine | 10 parts |
| Polyisodecyl methacrylate($\overline{M}_n$=5,000) | 1.5 parts |
| Titanium dioxide | 30 parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coatings obtained on each test panel after curing of the powder coating composition at a temperature of 140°C for 15 minutes is of good quality and has good adhesion characteristics. The powder coating composition on each panel is resistant to the solvents previously mentioned.

EXAMPLE 17

A monomer mixture having the following composition is prepared: glycidyl methacrylate 15 percent by weight, methyl methacrylate 40 percent by weight, 2-ethylhexyl acrylate 15 percent by weight, alpha methyl styrene 20 percent by weight and acrylonitrile 10 percent by weight. A copolymer is formed from this monomer mixture using 4 percent by weight of the catalyst AIBN.

The ground copolymer (100 parts by weight) is added to the following materials:

| | |
|---|---|
| 2-ethyl-4-methylimidazole | 1 part |
| Tetraethylammonium bromide | 0.4 parts |
| Poly(2-ethylhexyl acrylate) | 2 parts |
| Titanium dioxide | 30 parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 170°C for 20 minutes is of good quality and resistant to the aforementioned solvents.

EXAMPLE 18

A monomer mixture having the following composition is prepared: glycidyl methacrylate 20 percent by weight, butyl acrylate 40 percent by weight, methyl methacrylate 10 percent by weight and styrene 30 percent by weight. A copolymer is formed from this monomer mixture in accordance with the same procedure as is outlined in Example 1. In this case, 4 percent by weight of the catalyst AIBN is added. The copolymer produced has a glass transition temperature of 40°C and a molecular weight of 3,000.

The ground copolymer (100 parts by weight) is added to the following materials:

| | |
|---|---|
| Benzoguanamine | 10 parts |
| Polylauryl acrylate | 1.0 parts |
| Titanium dioxide | 30 parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 180°C for 10 minutes is of good quality and is resistant to the aforementioned solvents.

EXAMPLE 19

A monomer mixture having the following composition is prepared: glycidyl methacrylate 15 percent by weight, butyl methacrylate 15 percent by weight, ethyl acrylate 15 percent by weight, methyl methacrylate 30 percent by weight and styrene 25 percent by weight. A copolymer is formed from this monomer mixture in accordance with the same procedure as is outlined in Example 1. In this case, 4 percent by weight of the catalyst AIBN is added.

The ground copolymer (100 parts by weight) is added to the following materials:

| | |
|---|---|
| Triethylamine boron trifluoride complex | 0.6 part |
| Polylauryl acrylate | 0.5 part |
| Titanium dioxide | 30 parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 130°C for 30 minutes is of good quality and resistant to the aforementioned solvents.

EXAMPLE 20

A monomer mixture having the following composition is prepared: glycidyl methacrylate 15 percent by weight, 2-ethylhexyl acrylate 10 percent by weight, methyl methacrylate 50 percent by weight, methacrylonitrile 15 percent by weight, and alpha methyl styrene 10% by weight. A copolymer is formed from this monomer mixture in accordance with the same procedure as is outlined in Example 1. In this case, 4 percent by weight of the catalyst AIBN is added.

The ground copolymer (100 parts by weight) is added to the following materials:

| | |
|---|---|
| 2-methyl-4-ethylimidazole | 0.6 part |
| Tetraethylammonium bromide | 0.5 part |
| Polylauryl acrylate | 2.5 parts |
| Titanium dioxide | 30 parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 135°C for 30 minutes is of good quality. Also, the coatings are resistant to the aforementioned solvents.

There has been disclosed herein powder coating compositions which may be employed in the painting of articles. Many modifications of this invention will be apparent to those skilled in the art in view of this specification. It is intended that all such modifications which fall within the scope of this invention be included within the appended claims.

What we claim is:

1. A powder coating composition which, exclusive of pigment and antistatic agent, comprises a mixture of:

A. a copolymer of an ethylenically unsaturated glycidyl compound in such proportions as to obtain a copolymer with a glass transition temperature in the range of 40°C to 90°C and a molecular weight ($\bar{M}_n$) in the range of 2,500 to 8,500, said glycidyl compound being present in said copolymer from at least 8 percent by weight to no more than 25 percent by weight;

B. a cross linking agent formed of a compound which contains tertiary nitrogen atoms, said cross linking agent being present in the amount of 0.5 to 10 parts by weight for each 100 parts by weight of said copolymer; and C. a flow control agent present in the amount of 0.05 percent to 4.0 percent by weight, said flow control agent being a polymer having a molecular weight ($\bar{M}_n$) of at least 100 and being a polymer or copolymer selected from the group consisting of acrylic esters, methacrylic esters, and polyethylene or polypropylene glycol esters of fluorinated fatty acids.

2. The powder coating composition of claim 1 wherein: said glycidyl compound is selected from the group consisting of glycidyl acrylates and glycidyl methacrylate.

3. The powder coating composition of claim 1 wherein: said cross linking agent containing tertiary nitrogen atoms is selected from the group consisting of: tertiary amines, tetra alkylammonium salts that decompose on heating to produce tertiary amines, pyrimidines, piperidines, pyridenis, quinolines, isoquinolines, benzoguanamine, sicyandiamide and imidazoles.

4. The powder coating composition of claim 1 wherein: said ethylenically unsaturated compound is selected from the group consisting of methyl methacrylate, butyl methacrylate, butyl acrylate, ethyl acrylate, 2-ethylhexyl acrylate, styrene, alpha methyl styrene, acrylonitrile and methacrylonitrile.

* * * * *